Sept. 11, 1934.　　　　F. A. HART　　　1,973,314
TYPEWRITING MACHINE
Filed Sept. 24, 1932　　6 Sheets-Sheet 1

Fig.1

WITNESSES
N. Chillington

INVENTOR
Frederick A. Hart
BY
ATTORNEY

Sept. 11, 1934.  F. A. HART  1,973,314
TYPEWRITING MACHINE
Filed Sept. 24, 1932  6 Sheets-Sheet 3

WITNESSES

INVENTOR
Frederick A. Hart
BY Robert H. Strother
ATTORNEY

Sept. 11, 1934.   F. A. HART   1,973,314
TYPEWRITING MACHINE
Filed Sept. 24, 1932   6 Sheets-Sheet 5

Patented Sept. 11, 1934

1,973,314

UNITED STATES PATENT OFFICE

1,973,314

TYPEWRITING MACHINE

Frederick A. Hart, Stamford, Conn., assignor to Remington Typewriter Company, Ilion, N. Y., a corporation of New York Application September 24, 1932, Serial No. 634,670

26 Claims. (Cl. 197—178)

My invention relates to typewriting machines and more particularly to power actuated tabulator mechanism.

One of the main objects of the invention, generally stated, is to privide an improved power actuated tabulator mechanism in which the timing of the parts is accurately controlled to prevent false or improper operation.

In power actuated tabulator mechanism it is difficult to properly time and control the parts and prevent improper operation. This is especially true when such mechanism is employed in a combined typewriting and computing machine such for example as the Remington electrified bookkeeping machine in which computing mechanism such as is disclosed in the patent to Wahl No. 1,270,471 dated June 25, 1918 is used, and power actuated mechanism such as is disclosed in my application Serial No. 510,941, filed January 24, 1931 is employed.

It is necessary in such machines that the carriage be in a state of rest in its exact letter space position before a numeral key that controls the computing mechanism is actuated. Should the carriage rebound when it is arrested by the tabulator mechanism, as it always does to a greater or lesser extent, then a false or improper operation is apt to occur under the following conditions. Should the operator actuate a numeral key while the carriage is in a state of vibration or is shimmying, then one of two things may happen. If the extent of rebound of the carriage equals a letter space distance, of say $\frac{1}{10}$ of an inch, then the amount corresponding to the numeral key depressed will be entered in the wrong denominational position in the totalizer and a wrong computation is effected without the fact being observed by the operator.

On the other hand, if the extent of rebound of the carriage is less than a letter space distance when a numeral key is depressed, then the lock of the computing mechanism will prevent the setting up in the totalizer of the amount represented by the depressed numeral key.

It is one of the main objects of the present invention to overcome these difficulties and to provide comparatively simple and efficient means for assuring an accurate timing of the parts that will delay the restoration of the projected tabulator stop to normal position and the restoration of the carriage to the control of its escapement mechanism until the vibration or shimmying of the carriage has ceased.

A further object of the invention is to provide means for automatically locking the numeral keys against depression until the projected tabulator stop has been substantially returned to normal position and the carriage has been restored to control of its escapement mechanism.

A still further object of the invention is to provide mechanism of the character referred to which may be readily embodied in existing machines without modifying, or materially modifying, the existing structural features thereof.

Another object of the invention is to provide mechanism of the character specified in which coacting parts of the tabulator mechanism are brought into cooperative relation when two sections of the frame of the machine are brought together.

To the above and other ends which will hereinafter appear the invention consists of the features of construction, arrangements of parts and combinations of devices set forth in the following description and particularly pointed out in the appended claims.

In the accompanying drawings wherein like reference characters indicate corresponding parts in the different views—

The present invention is in the nature of an improvement on the structure disclosed in my copending application Serial No. 575,345, filed Nov. 16, 1931.

In the present instance the invention is shown embodied in the Electrified Remington bookkeeping machine such as is disclosed in my co-pending application Ser. No. 510,941 hereinbefore referred to. It should be understood, however, that the invention is not restricted to embodiment in said machine but may be employed in typewriting and computing machines generally, wherever found available.

The denominational tabulator mechanism disclosed in the present instance corresponds substantially in part to that commonly employed in Remington machines. From an inspection of Fig. 6 it will be seen that the usual carriage, comprising end bars 1, a rear cross bar 2, and a front cross bar (not shown) supports a platen 3 and is mounted on crossed bearing rollers 4 at the front and rear of the carriage to travel from side-to-side of the machine. The carriage supports bracket arms 5 on which a column stop bar 6 is fixed, said bar having a series of column stops 7 mounted thereon.

A series of denominational stops 8 are arranged at letter space intervals, each stop being in the nature of a slide that is supported for movement fore and aft of the machine in guide combs 9 and 10 which are supported on a tabulator frame 11 detachably secured to the upper frame section 12 of the machine frame. Each denominational tabulator stop is recessed at 13 to receive the upper end of a denominational stop lever 14 pivoted at 15 in the tabulator frame 11. The lower end of each lever terminates in the rear of a coacting slide 16 to be actuated thereby. Each slide 16 has a central slot 17 therein to receive two transversely extending supporting pins 18 secured at their ends to a pair of sheet metal arms 19. The slides 16 are separated by guide combs 20 and 21 which constitute part of a sheet metal frame 22 that is connected to the arms 19 by the pins 18. Each arm 19 is pivoted at 23 to the lower end portion of the tabulator frame 11 and is provided with an upwardly and rearwardly extending arm or finger 24 that coacts with a stop pin 25 carried by the tabulator frame. A contractile spring 26 is connected at one end to a pin 27 on the companion arm 19 and at its opposite end to the stop pin 25. The force of each spring is exerted to normally maintain the pivoted frame, comprising the arms 19 and frame 22, in a position shown in Fig. 6 for purposes which will hereinafter more clearly appear.

Figure 6:
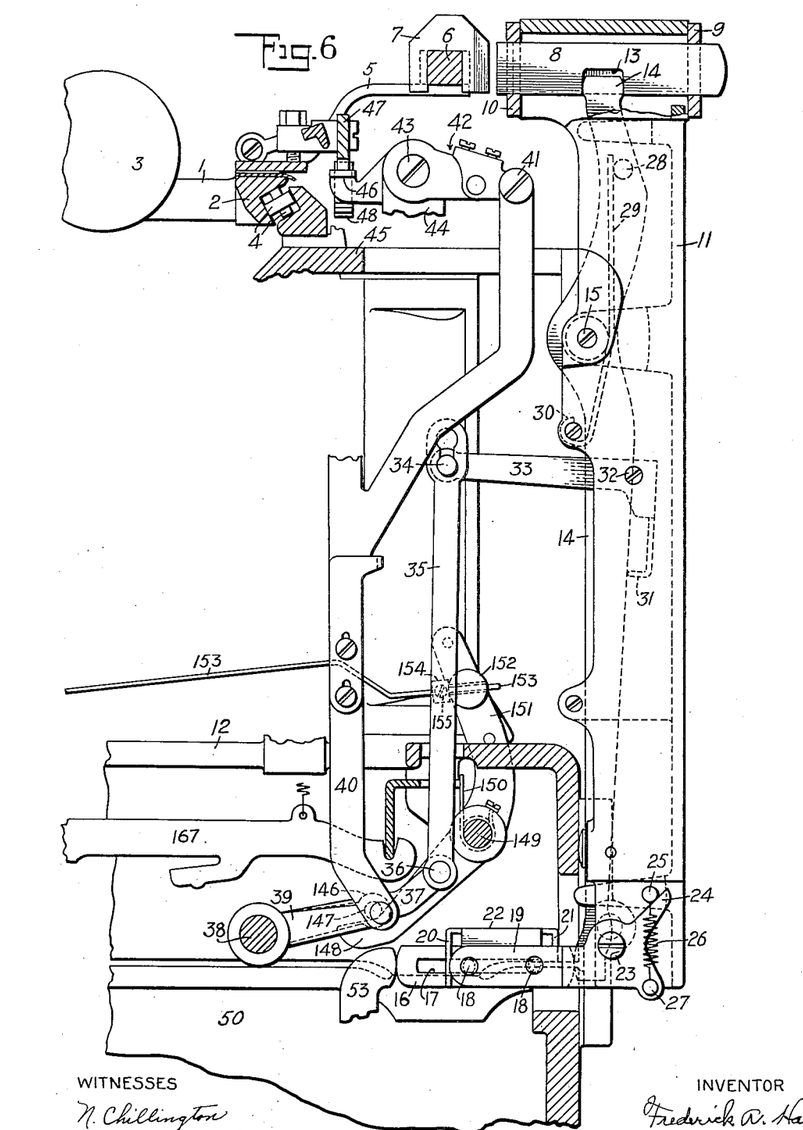
Fig. 6 is a detail, fragmentary, vertical, sectional view of a portion of the tabulator mechanism and some of the associated parts.

Each lever 14 carries a laterally projecting pin 28 against which one arm of a spring 29 bears, the opposite end of each of said springs being anchored at 30 to the tabulator frame. The force of each of the springs 29 is exerted to return the associated stop lever 14 to normal position.

In accordance with the present invention the slides 16 are operated by power actuated means to be hereinafter described and thus control the movement of the denominational stops 8 to and from projected position, or into and out of the path of the column stops 7.

The movement of any denominational stop to effective position is operative to release the carriage from control of its escapement mechanism so as to free the carriage for tabulating movement. In the present instance this is effected by a universal bar 31 which is actuated by an operation of any of the denominational stop levers 14. The bar 31 is carried by and pivoted at 32 to the tabulator frame and is provided with a forwardly extending arm 33. A headed pin 34 on said arm is received in a keyhole slot in a link 35 pivoted at its lower end, at 36, to a crank arm 37 on a rock shaft 38. Another crank arm 39 on this rock shaft is connected to an upright link 40 pivoted at 41 to a two-part rack-releasing-device 42. Said releasing device is pivoted at 43 to a standard 44 on the top plate 45 of the machine. The releasing device is provided with a contact shoe 46 that underlies a feed rack 47 carried by the carriage in the usual manner and normally engaging a feed pinion 48 operatively connected with the escapement wheel of the carriage feed mechanism.

An anti-clockwise movement of any lever 14 against the force of its returning spring 29 is effective to project the corresponding stop 8 to effective position, and also results in rocking the universal bar 31 and transmitting an upward movement to the contact shoe 46, thereby disengaging the feed rack 47 from its feed pinion 48.

It will be understood that so far as the power actuated mechanism of the present invention which is about to be described is concerned, it may be employed to actuate any suitable tabulator mechanism although such power actuated mechanism was especially designed in the present instance for cooperation with the tabulating mechanism shown.

The power controlled actuating devices about to be described are supported by a separate auxiliary frame, designated as a whole by the reference numeral 49, which is detachably connected to the base section 50 of the main frame of the machine by screws 51, so that said frame 49 and the parts carried thereby may be introduced into and removed from the machine as a single unit.

Figure 1:
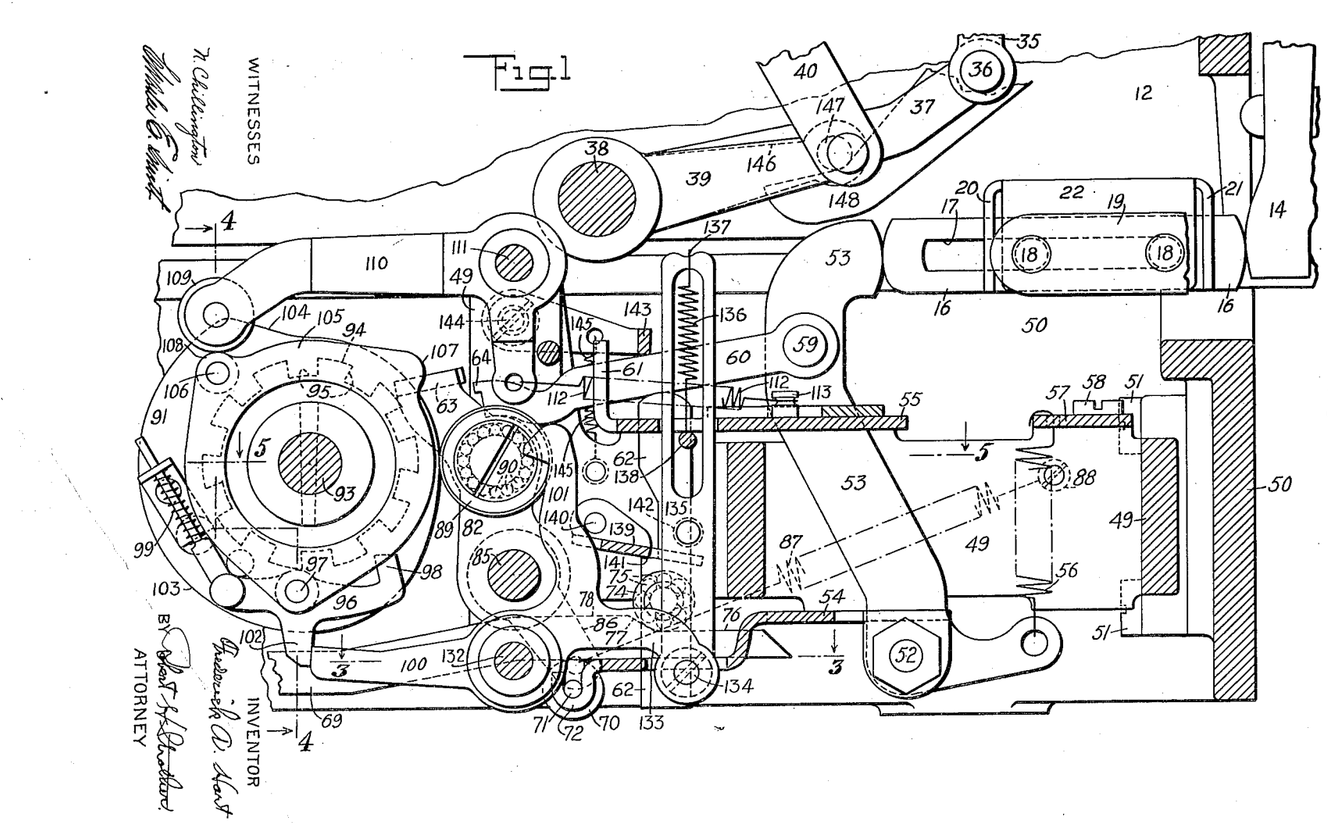
Fig. 1 is an enlarged, detail, fragmentary, vertical, fore and aft sectional view, showing parts of the tabulator mechanism with the parts in normal condition.

The auxiliary frame 49 supports a pivot rod 52 (see Fig. 1) on which are mounted a series of angular or bell crank levers or actuating devices 53, equal in number to the slides 16 and the tabulator-stop actuating-levers 14 with which they coact. The levers 53 are guided by guide combs 54 and 55 supported by the auxiliary frame and the upper rearwardly extending end of each lever 53 coacts with the forward end of the associated slide 16. The horizontally disposed arm of each lever 53 is connected to one end of a contractile spring 56, anchored at its other end to a plate 57 secured to the auxiliary frame by screws 58. The upright arm of each lever 53 has pivoted thereto, at 59, a link, selective actuating device or interponent 60 that swings vertically and also moves bodily fore and aft of the machine in a slot in an upright guide comb 61. This guide comb is formed from the same piece as the guide comb 55 and is secured to the auxiliary frame. Cooperative with each interponent 60 is an underlying slide 62, each slide being guided for vertical movement at its upper end in a slot in a plate in which the guide combs 55 and 61 are formed. At its lower end each slide 62 is guided in a guide slot in the plate in which the guide comb 54 is formed. Each slide 62 is arranged directly beneath and coacts with the associated interponent 60 so that an elevation of a slide will result in swinging the forward end of the associated interponent upward around its pivot 59 from the Fig. 1 to the Fig. 2 position. This results in bringing the free end of the elevated interponent into the path of movement of a universal actuating member or bail 63, adapted to receive a reciprocatory or an oscillatory movement fore and aft of the machine and to coact with any one of the interponents 60 when the latter is raised into the path thereof. Each interponent is provided with a forwardly extending projection 64 at the upper edge thereof. It will be seen from an inspection of Fig. 2 that this projection overlies the rear edge of the actuating bail when the parts are in cooperative relation. The result of this is that the actuated interponent is positively prevented from being released or separated from the bail until the parts are restored substantially to the normal positions. Just before the parts reach such normal position the bail 63 will release itself from beneath the projection 64 on the interponent, permitting the latter to drop down out of the path of the bail, as shown in Fig. 1.

The manner in which the interponents 60 are selectively elevated into the path of the universal actuating member or bail 63 will now be described.

Figures 7, 8, 9:
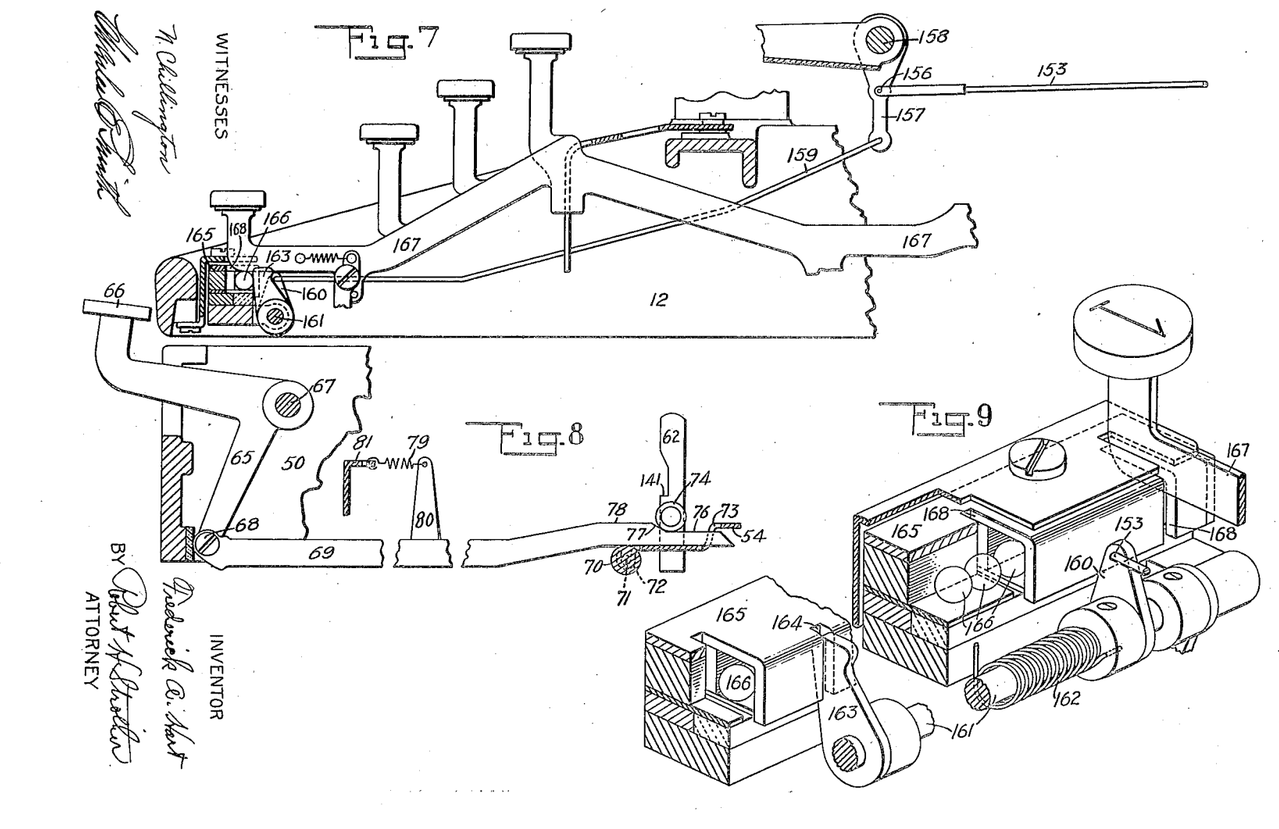
Fig. 7 is a detail, fragmentary, vertical, fore and aft sectional view showing the numeral keys and the lock therefore, together with some of the associated parts.
Fig. 8 is a side view with the parts in section of one of the tabulator keys, its controlling link and the selecting slide which cooperates therewith.
Fig. 9 is a detail, fragmentary, perspective view of the numeral key locking means.

Referring more particularly to Fig. 8, it will be understood that a series of bell crank tabulator levers 65, provided with tabulator keys 66, are pivotally supported on a pivot rod 67 that receives its support on the base section 50 of the machine frame. The depending arm of each lever 65 is detachably pivoted at 68 to a link 69 that extends fore and aft of the machine. From a consideration of Fig. 5 it will be understood that the forward end portions of the links 69 extend in converging vertical planes, whereas the rear portions thereof are arranged in vertical parallel planes where they are supported from beneath by a supporting roller 70. This roller is provided with reduced ends 71 by which the roller is supported in bearings provided for by U-shaped bracket arms 72 formed on the same plate in which guide comb 54 is cut. This plate has a right angle bend therein and in the upright portion of which there is provided a series of guide slots 73 (Figs. 5 and 8) each adapted to receive and guide the free end portion of one of the links 69. Each link 69 at its rear end portion is arranged adjacent to its companion slide 62 and the latter carries an anti-friction roller 74, preferably supported on its slide by ball bearings 75 (see Fig. 1). Each roller 74 rests on the upper edge of its companion link 69 and is adapted to coact with a cam thereon. Each of these cams comprises a lower portion 76 on which the companion roller 74 normally rests, an inclined face 77 by which the companion slide is elevated when the link is moved rearward, and a dwell 78 on which the roller is supported to hold the companion slide in its elevated position and resist any tendency of the actated slide 62 to return to normal position until its companion link 69 moves forward to normal position. The return of each tabulator key lever 65 and its link 69 to normal position, when the depressed key is released by the operator, is effected by a contractile return spring 69 connected at one end to an upright arm 80 on the companion link 69 and anchored at its other end to an angular bar 81. One effect, therefore, of depressing a tabulator key is to elevate an interponent 60 into the path of movement of the actuating member 63 and hold said interponent in such position as long as a key is held depressed by the operator and until it has been returned substantially to normal position.

The actuating member 63 is mounted and controlled in a manner now to be described.

Figure 5:
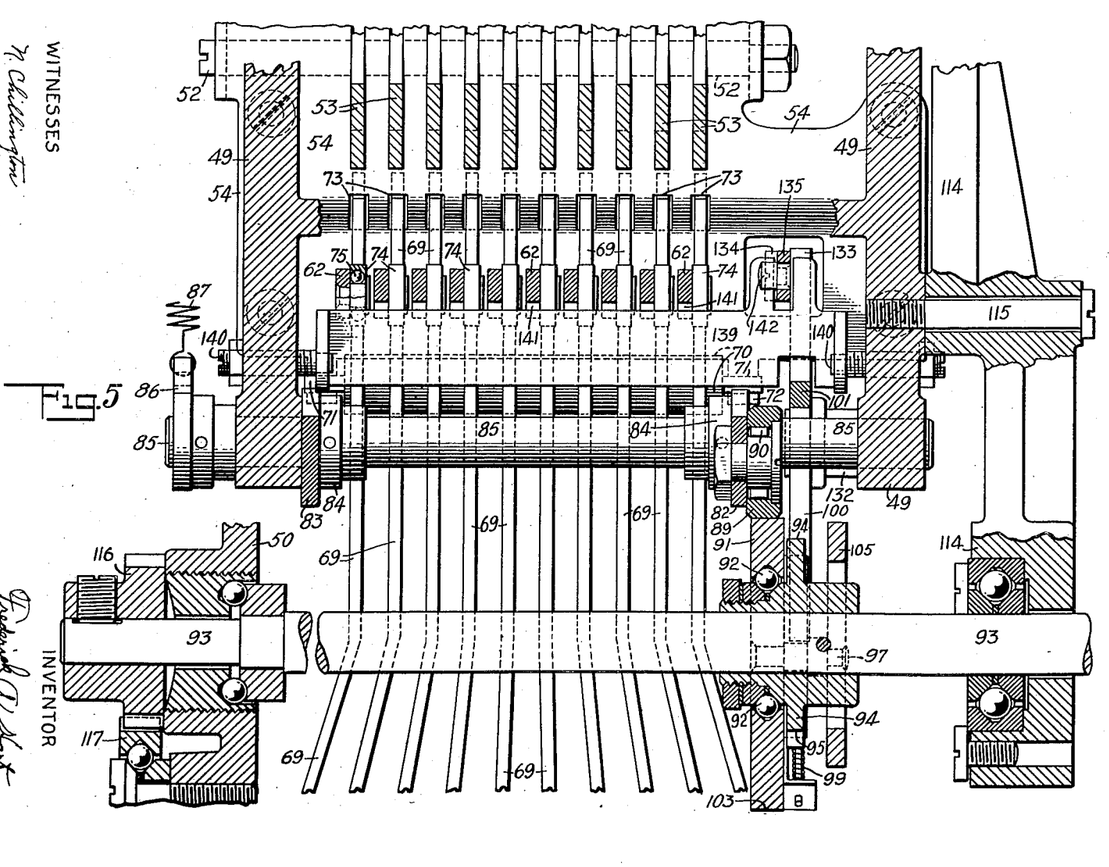
Fig. 5 is an enlarged, detail, horizontal, sectional view of a portion of the tabulator mechanism taken on the line 5—5 of Fig. 1 and looking in the direction of the arrows at said line.

The member 63 in addition to the cross bar which coacts with all of the interponents 60 has depending supporting arms 82 and 83 at the ends thereof. Each of these arms has a hub 84 pinned to a rock shaft 85 mounted to rock in bearings in the auxiliary frame 49. As shown in Fig. 5 the left-hand end of this shaft extends beyond said frame where the shaft is provided with a crank arm 86 to which one end of a contractile returning spring 87 is attached, the opposite end of the spring being anchored on a pin 88 (see Fig. 1) that projects from the frame 49. The arm 82 carries an anti-friction roller 89 mounted on ball bearings 90. The roller 89 coacts with the periphery of a rotative cam 91 to control the back and forth movements of the actuating member 63, and through the key selected interponents 60 control the denominational tabulator stops 8 and the carriage releasing devices.

The cam 91 is controlled at each actuation of a tabulator key in the following manner. The cam 91 is preferably mounted to turn on ball bearings 92 (see Fig. 5) on a continuously running motor-driven shaft 93. Adjacent to said cam and fixed to the shaft 93 is a locking wheel 94 notched at regular intervals, as indicated at 95 in Fig. 1. The cam 91 carries a latch 96 pivoted on one side thereof, as indicated at 97. The engaging nose 98 of this latch is adapted to be received in one or another of the notches 95 in the locking wheel and thus connect the cam 91 to revolve with shaft 93. A spring 99 exerts its force on the latch 96 to bring about an engagement thereof with the locking wheel. However, when either of two trip devices 100, 101 engages a projection 102 on the latch, as shown in Figs. 1 and 2, the latch will be maintained in the disengaged position against the force of its spring 99, thus holding the cam against movement with the shaft 93.

Figures 2, 3, 4:
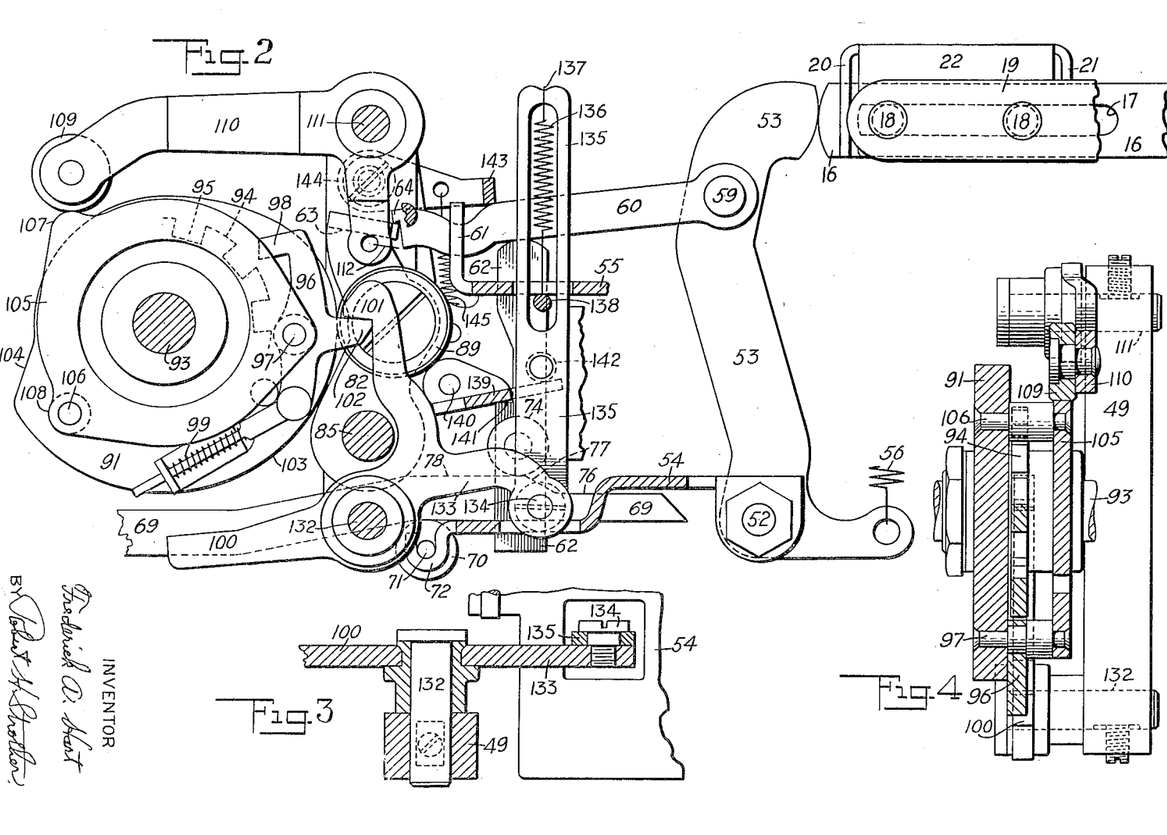
Fig. 2 is a corresponding view in part of the same showing the devices in actuated position.
Fig. 3 is an enlarged, detail, fragmentary, horizontal sectional view taken on the line 3—3 of Fig. 1 and looking in the direction of the arrows at said line.
Fig. 4 is an enlarged, detail, fragmentary, vertical sectional view taken on the line 4—4 of Fig. 1 and looking in the direction of the arrows at said line.

As the parts are shown in Fig. 1, the low point on the cam has a contactive engagement with the roller 89, whereas in Fig. 2 the high point on the cam has contactive engagement with the roller 89. From this it will be understood that it requires substantially one quarter of a revolution of the cam from the Fig. 1 to the Fig. 2 position in order to effect an actuation of the actuating bail 63 and the parts controlled thereby. Coincident with the high point on the cam is a dwell 103 which constitutes a continuation of such high portion and continues for a considerable extent, occupying about one half the cam. The dwell terminates at the inclined face 104 which affords a return movement of the bail and the parts controlled thereby to normal position. It will be understood therefore that the parts are under the control of the dwell 103 from the time the cam is released from the Fig. 2 position until it has completed a clockwise movement of almost one half of its revolution and the inclined portion 104 on the cam reaches the roller 89. It will be seen therefore that during this period while the roller 89 remains on the high portion of the cam and the dwell 103 thereof, the actuated tabulator stop will be maintained in its projected position and the carriage releasing devices will be held in effective position and cannot return to normal position until the dwell on the cam passes the roller 89 and the cam has almost completed its cycle. This is an important factor in the present construction as will hereinafter more clearly appear.

Separate from but attached to the cam 91 is a second cam 105 which is secured to the cam 91 by intervening separating posts 106 and 97, which latter also constitutes a pivot for the latch 96. The cam 105 has two high spots 107 and 108 thereon separated a distance corresponding approximately to one quarter of the revolution of the two connected cams 91 and 105. Coacting with the edge of the cam 105 is a detent roller 109 carried by an angular lever 110 pivoted at 111 and having a contractile spring 112 connected to the depending arm thereof, the opposite end of this spring being anchored to a pin 113 carried by the comb plate 55, as shown in Fig. 1. The roller 109 constitutes therefore a spring pressed detent which coacts with the cam 105 to hold it and the cam 91 against accidental displacement from either the Fig. 1 or the Fig. 2 position when the latch 96 is released from its locking wheel. In the Fig. 1 position the detent roller coacts with the high point 109 on its cam to resist or counteract the force of the spring 99 of the latch which at this time would tend to turn the cams 105 and 91 in an anti-clockwise direction. In the Fig. 2 position of the parts the detent coacts with the high spot 107 on the cam 105 for the same purpose.

The motor driven shaft 93 is preferably supported at its left-hand end on ball bearings in one side of the base section 50 of the frame, as shown in Fig. 5. The shaft is supported intermediate its ends by ball bearings in an arm 114 detachably secured by screws 115 to the auxiliary frame 49 and arranged in close proximity to the cam 91. The right-hand end of the shaft 93 is supported on a ball bearing (not shown) in the base section, such bearing corresponding to that employed at the other end of the shaft.

Figure 10:
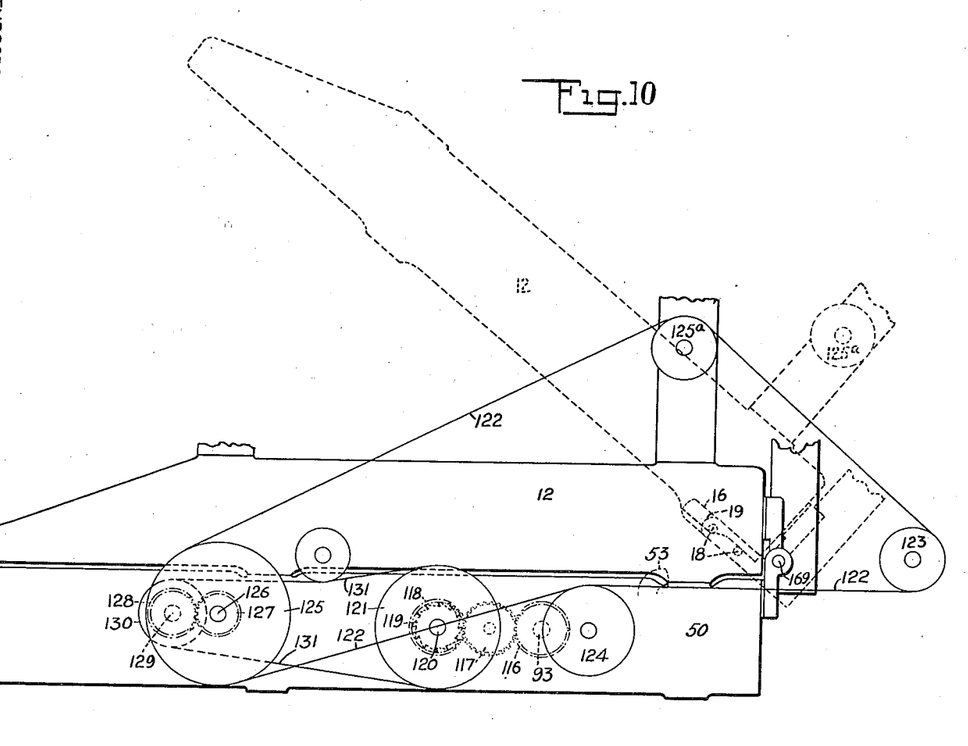
Fig. 10 is a diagrammatic, fragmentary, side view of the frame of the machine with some of the parts carried thereby.

The left-hand end of the driving shaft 93, where it extends beyond the base, has a pinion 116 fixed thereon. From a consideration of Figs. 5 and 10 it will be seen that the pinion 116 meshes with an idler 117 mounted on ball bearings on the base of the frame. This idler in turn meshes with a gear 118 by which the snatch roll 119 for the alphabet printing instrumentalities is actuated. The snatch roll 119 is mounted on a shaft 120 which carries a pulley 121. It will be seen that a driving belt 122 passes over a motor driven pulley 123, over an idle pulley 124 to a driving pulley 125, thence over a pulley 125ª to the motor driven pulley 123. The pulley 125 is carried by shaft 126 and carries a pinion 127 which meshes with a gear 128 on a shaft 129 that carries a driving pulley 130. A driving belt 131 extends from the pulley 130 to a pulley 121. Motion is thus transmitted from the motor driven pulley 123 to the constantly driven cam shaft 93. For the purposes of the present invention, however, the continuously driven shaft 93 may be actuated by any suitable means.

For the purpose of the present case it is unnecessary to show and describe the details of the mechanism by which the power actuated type bars and computing mechanism are operated, it being sufficient to point out that these parts may be actuated in the same manner as disclosed in my application Ser. No. 510,941 hereinbefore referred to.

I will now describe the means by which the trips 100, 101 are controlled from the tabulator keys and control the revolution of the cam 91. The trip 100 which normally engages the latch 102 and holds the cam 91 against movement, is, in the present instance, pivoted on a stub shaft 132, which it will be seen from Fig. 3 is supported at one end in a bearing in one of the side plates of the auxiliary frame 49. The trip 100 constitutes part of a three-arm lever of which one arm is formed by the second trip 101. The third arm 133 of this lever extends rearward and is pivoted at 134 to an upwardly extending link 135 that is received and guided in a guide opening in the comb plate 55. The upper portion of this link has an elongated opening therein to receive a contractile spring 136 secured at its upper end 137 to the link and anchored at its lower end to a fixed pin 138. The force of this spring is exerted to maintain the link 135 and trips 100 and 101 in the normal Fig. 1 position. The effect of moving the double trip 100, 101 from the Fig. 1 position to the Fig. 2 position is to release the latch 96 from control of the trip 100 and interpose the hook-like upper end of the trip 101 into the path of the projection 102 on the latch and effect a release of said latch from the locking wheel when the cam reaches the Fig. 2 position.

In order to effect a control of the trips 100, 101 by an actuation of any tabulator key, I employ a universal bar 139 pivoted at 140 (see Figs. 1 and 2) and the cross bar of which extends over and bears on shoulders 141 on the forward edges of the series of vertically movable slides 62. An inwardly extending pin 142 projects from the link 135 and overlies the universal bar 139, but, in the normal position of the parts illustrated in Fig. 1, is at some little distance above the upper surface of said bar, so as to provide a lost motion connection between the universal bar and the link 135. It will be understood that on a depression of the tabulator key 66, the corresponding actuating link 69 is moved rearward, thus elevating the associated slide 62. This results in lifting the rear end of the universal bar 139 and after the lost motion between it and the pin 142 is taken up, an elevation of the link 135 from the Fig. 2 to the Fig. 1 position will result. The effect of this is to turn the three-armed member comprising the trips 100, 101 and the arm 133 from the Fig. 1 to the Fig. 2 position. This releases the latch 96 permitting it to engage the locking wheel so as to turn the cam 91 with the constantly driven shaft 93 during a quarter revolution, or until the latch 96 reaches the Fig. 2 position, where it will be automatically released by the trip 101. This quarter revolution of the cam is effective to shift the universal actuating member 63 from the Fig. 1 to the Fig. 2 position and to actuate the interponent 60 which has previously been elevated into the path of the universal actuating member 63. Due to the lost motion connection hereinbefore referred to between the universal bar 139 and the pin 142, an upward movement of the corresponding interponent 60 will be effected on the depression of a tabulator key before the cam is released from the control of its trip 100, or in any event before motion is transmitted to the universal actuating member or bail 63. This insures the accurate positioning of the interponent in the path of the bail 63 and at a sufficient height so that the projection 64 on the interponent will be in a position to overlap the bail 63 before the latter is actuated. When a tabulator key is depressed to release the cam 91 from the trip 100 as just described, the corresponding interponent 60 for the key actuated will be elevated in the manner described and the cam 91 will be given a quarter revolution to the Fig. 2 position, resulting in projecting the selected denominational stop 8 and releasing the carriage from control of its escapement mechanism by lifting the feed rack 47 from the feed pinion 48. As long as pressure is maintained on the actuated tabulator key the parts will be held in this position.

When the carriage is arrested by the engagement of one of the column stops 7 with the projected denominational stop 8, the operator releases the tabulator key and due to the dwell 103 on the cam 91 the rack will not be immediately re-engaged with its feed pinion and the projected stop will not be immediately returned to normal position, and will not be returned to such position until the cam has completed a substantial portion of its cycle and the dwell thereon has passed the roller 89, bringing the inclined portion 104 of the cam into use near the last portion of the cycle of the cam. This delayed restoration of the projected denominational stop to normal position and the carriage to the control of its escapement mechanism, is sufficient to allow the carriage to settle after its rebound and remain quiescent. If, therefore, a numeral key should be actuated immediately after the release by the operator of a tabulator key, no harmful result would follow since the delayed restoration of the parts to normal position by the dwell 103 on the cam 91 will give sufficient time to overcome the difficulties that would occur in the event of such actuation taking place while the carriage is still shimmying.

It will be understood that the extent of the dwell 103 on the cam 91 may be prolonged if desired, thereby still further prolonging the period of restoration of the parts to normal position. However, I have found in practice that the extent of dwell indicated in the drawings is sufficient for practical purposes, and that to extend the dwell beyond the limits indicated tends only to unduly delay the restoration of the parts beyond what is necessary for all practical purposes, thereby slowing up the general operation of the machine.

In the specification and claims the cam 91 has been referred to as having a "long" dwell 103 thereon. This term is employed to define a dwell of considerable length; of such length as is necessary to maintain the parts controlled thereby in actuated position sufficiently long to permit the arrested and shimmying carriage to settle and assure a proper subsequent actuation of the numeral printing mechanism and the computing mechanism and other features of the machine. Such term is employed to differentiate the construction from one such as is shown in my companion application Serial No. 575,345, wherein no such dwell is provided.

In order that the actuated interponent may be promptly restored to normal position when it is released from the actuating bail 63 I have provided a universal bar 143 that is pivoted at 144 and overlies the entire series of interponents. A contractile spring 145 is connected at one end to one of the supporting arms for universal bar 143 and is anchored at its other end to a pin on the auxiliary frame 49. The force of this spring is exerted to pull the universal bar 143 down, thereby forcing the upwardly displaced interponent 60 back to normal position when the corresponding link 69 is withdrawn from the associated slide 62 and the bail 63 has substantially returned to normal position.

In addition to providing a delayed restoration of the parts in the manner described, I prefer to employ automatically actuated locking means for the numeral keys in order to prevent an actuation thereof when any tabulator key is depressed and to maintain such locking means in the actuated or effective position until the delayed restoration of the parts under control of the cam 91 has been completed. This locking mechanism will now be described.

Referring more particularly to Fig. 6 it will be seen that a third arm 146 is provided on the rock shaft 38. The free end of this arm 146 carries a laterally projecting pin 147 which overlies a crank arm 148 secured to a rock shaft 149 that is returned to its normal position by a spring 150. An upwardly projecting arm 151 on the rock shaft 149 carries a laterally projecting stud 152 which has an opening that extends therethrough for the reception of the rear end of a wire link 153. A collar 154 is secured on the link by a set screw 155. This collar is positioned forward of the stud 152 and constitutes an abutment with which the stud coacts to move the link 153 forward when the arm 151 receives an anti-clockwise movement. The link 153 extends forward, and is connected at its forward end, as at 156, to a depending lever arm 157, as shown in Fig. 7. The upper end of the lever 157 is pivoted at 158 and is connected at its lower end to a forwardly extending link 159. The forward end of link 159 is connected to a crank arm 160 fixed on a shaft 161, which shaft and the parts controlled thereby are returned to normal position by a spring 162 (see Fig. 9). This shaft also carries a locking arm or blade 163 which is fixed thereto and is adapted to project through a slot 164 in a housing 165 of a ball lock mechanism such as is disclosed in my application Ser. No. 549,852, filed July 10, 1931. A series of locking balls 166 is received in a channel in this housing and such balls are closely associated, there being sufficient room only to receive the locking blade 163 in order to prevent any longitudinal displacement of the balls. The effect of this is to prevent the depression of any of the numeral printing key levers 167 that are adapted to enter slots 168 in the housing and to enter the space between two adjacent balls in the event that the locking blade 163 is not in locking position, but to prevent a depression of any key lever 167 in the event that the locking blade is in locking position.

When, therefore, the cam 91 is released and moves from the Fig. 1 to the Fig. 2 position, this results in projecting the selected denominational stop 8, and the movement of its corresponding stop lever 14 in an anti-clockwise direction in Fig. 6. This in turn results in turning the frame comprising the universal bar 31 and arm 33 in a corresponding direction. The effect of this is to lower the link 35 and rock the shaft 38 in a clockwise direction, as the parts appear in this figure, and to move the arm 149 down and the upper arm 151 forward and effect a forward shifting of the links 153 and 159. This results in rocking the shaft 161 in an anti-clockwise direction, as the parts appear in Figs. 7 and 9, thus bringing the locking blade 163 into locking position between the balls 166, thereby preventing a depression of any of the numeral printing key levers 167. The parts will remain in this condition until the cam 91 has completed a considerable part of its cycle and the dwell 103 has passed the roller 89. Then a restoration of the projected denominational stop 8 and its controlling lever 14 will enable the key locking mechanism to be restored to normal position and release the key locking mechanism by withdrawing the locking blade 163 from a position to which it was moved between two adjacent balls 166.

From the foregoing description it will be understood that the release of the lock is under the control of the cam 91 and that the lock will not be released until after the delayed action of the parts due to the dwell 103 on the cam 91.

It has been hereinbefore pointed out that I prefer to make the frame of the machine in two sections, one the upper section 12 and the other the lower section 50. These sections are preferably united by hinges, as indicated at 169 in Fig. 6. These hinges connect the sections at the rear of the machine and enable them to be separated, as indicated in dotted lines in Fig. 10, or to be brought together as indicated in full lines in said figure. The construction in the present instance is such as to facilitate this movement of the sections relatively one to another without interference from coacting parts of the tabulator mechanism. As will be understood from a consideration of Fig. 6 the upper hinged section 12 may be turned on its hinges 69 carrying with it in such movement the pivoted arms 19 and the parts carried thereby. On the other hand the actuating members 53 are mounted in the base section of the frame and do not move with the slides 16 as the latter are elevated during an upward turning movement of the section 12. When the two sections of the frame are brought together, however, the members 53 and 16 will be brought into cooperative relation ready for operation. If by chance any of the members 53 is maintained in the actuated position when the upper section of the frame is moved down from the dotted line to the full position in Fig. 10, no harm can result to the mechanism inasmuch as the associated slide 16 will bear against the top of the cooperating actuating member 53 and will thus be held while the section 12 and the remaining parts carried thereby move to the full line position in Fig. 10. At this time the springs 26 will be stressed, and as soon as the actuated member 53 is returned to normal position, the arms 19, frame 22, and slides 16 carried thereby will be moved down to effective position by the reaction of the springs 26. By these means no injury can result to the machine and the coacting parts 16 and 53 carried by the two frame sections will be automatically brought into cooperative relation when the sections are brought together.

Various changes may be made in the construction, and some of the features may be employed without others, without departing from my invention as it is defined in the accompanying claims.

What I claim as new and desire to secure by Letters Patent is:

1. The combination of a carriage, tabulator stops, and key controlled power actuated means for controlling the movement of said stops to and from effective position and for throwing the carriage out of and into control of its escapement mechanism, said means including a key controlled power actuated cam, means by which said cam makes a partial revolution only on the depression of a tabulator key to project a tabulator stop and release the carriage from control of its escapement mechanism, said cam having a dwell that maintains the parts thus conditioned during a considerable portion of the remainder of the revolution of said cam, and means by which such remainder of the revolution of the cam takes place when the actuated tabulator key is released and returns to normal position, whereby time is afforded to permit the carriage to settle in its arrested position before control of the carriage by its escapement mechanism is reestablished and due to the maintenance of the parts in actuated position by said dwell on the cam.

2. The combination of a carriage; tabulator stops; key controlled power actuated means for controlling the movement of said stops to and from effective position and for throwing the carriage out of and into control of its escapement mechanism, said means including a key controlled power actuated cam, means by which said cam makes a partial revolution only on the depression of a tabulator key to project a tabulator stop and release the carriage from control of its escapement mechanism, said cam having a dwell that maintains the parts thus conditioned during a considerable portion of the remainder of the revolution of said cam, and means by which such remainder of the revolution of the cam takes place when the actuated tabulator key is released and returns to normal position, whereby time is afforded to permit the carriage to settle in its arrested position before control of the carriage by its escapement mechanism is reestablished and due to the maintenance of the parts in actuated position by said dwell on the cam; printing keys; and locking means controlled by said cam for locking said printing keys against actuation during the cycling of said cam and for releasing them after the parts have been released from the control of the dwell on the cam.

3. The combination of a carriage, escapement mechanism therefor, tabulator stops, and key controlled means including a rotary power driven cam for actuating said stops and releasing the carriage from control of its escapement mechanism, said cam having a dwell to maintain the parts controlled thereby in actuated position through a considerable portion of the revolution of said cam and to thereby delay the restoration of the projected stop and the returning of the control of the carriage to its escapement mechanism until the carriage has ceased shimmying after having been arrested by the tabulator stops.

4. The combination of a carriage; escapement mechanism therefor; tabulator stops; key controlled means including a rotary power driven cam for actuating said stops and releasing the carriage from control of its escapement mechanism, said cam having a dwell to maintain the parts controlled thereby in actuated position through a considerable portion of the revolution of said cam and to thereby delay the restoration of the projected stop and returning of the control of the carriage to its escapement mechanism until the carriage has ceased shimmying after having been arrested by the tabulator stops; printing keys; and locking means controlled by said cam for locking said printing keys against actuation during the cycling of said cam and for releasing them after the parts controlled by the cam have been released from control of the dwell thereon.

5. The combination of tabulator stops, a power driven cam, tabulator keys, and means controlled by said keys for selectively moving said stops to effective position by said cam, said cam having a dwell thereon for maintaining the parts controlled by the cam in actuated position through a considerable portion of the revolution of the cam.

6. The combination of tabulator stops; a power driven cam; tabulator keys; means controlled by said keys for selectively moving said stops to effective position by said cam, said cam having a dwell thereon for maintaining the parts controlled by the cam in actuated position through a considerable portion of the revolution of the cam; printing keys; and locking means therefor controlled by said cam for locking the printing keys against actuation during the cycling of said cam and for releasing them after the parts controlled by the cam have been released from control of the dwell thereon.

7. The combination of tabulator stops, a power driven cam having a long dwell extending throughout a considerable portion thereof, tabulator keys, means controlled by said keys for selectively moving said stops to effective position by said cam including means effective on the depression of a tabulator key for disconnecting said cam from its power driven means after the cam has completed a part only of its cycle, thereby holding the projected stop in effective position while the key is maintained depressed and also after the actuated key has been released and so long as the parts controlled by the cam are under the control of the dwell thereon and the cam has substantially completed its cycle.

8. The combination of a carriage, escapement mechanism therefor, a power driven cam having a long dwell thereon, tabulator stops, tabulator keys, means controlled by said keys for selectively moving said stops to effective position and for releasing the carriage from control of its escapement mechanism by said cam, said means including means for arresting said cam and disconnecting it from its power driven means after the cam has completed a part only of its cycle and before said dwell has come into use, the construction and arrangement of the parts being such that this movement of the cam from its initial position projects a tabulator stop and releases the carriage from control of its escapement mechanism and maintains the parts thus conditioned so long as a tabulator key is maintained depressed and until the parts are no longer under control of the dwell on the cam after the actuated key has been released.

9. The combination of tabulator stops; a power driven cam having a long dwell thereon; tabulator keys; means controlled by said keys for selectively moving said stops to effective position by said cam, said means including means effective on the depression of a tabulator key for disconnecting said cam from its power driven means after the cam has completed a part only of its cycle, thereby holding the projected stop in effective position while the key is maintained depressed and also after the actuated key has been released and so long as the parts controlled by the cam are under the control of the dwell thereon; printing keys; and locking means therefor controlled by said cam for locking the printing keys against actuation during the cycling of said cam and for releasing them after the parts controlled by the cam have been released from control of the dwell thereon.

10. The combination of a carriage; escapement mechanism therefor; a power driven cam having a long dwell thereon; tabulator keys; means controlled by said keys for selectively moving said stops to effective position and for releasing the carriage from control of its escapement mechanism by said cam, said means including means for arresting said cam and disconnecting it from its power driven means after the cam has completed a part only of its cycle and before said dwell has come into use, the construction and arrangement of the parts being such that this movement of the cam from its initial position projects a tabulator stop and releases the carriage from control of its escapement mechanism and maintains the parts thus conditioned so long as a tabulator key is maintained depressed and until the parts are no longer under control of the dwell on the cam after the actuated key has been released; printing keys; and locking means therefor controlled by said cam for locking the printing keys against actuation during the cycling of said cam and for releasing them after the parts controlled by the cam have been released from control of the dwell thereon.

11. The combination of a carriage, escapement mechanism therefor, a tabulator stop, key controlled power actuated means for controlling the movement of said tabulator stop to and from effective position and for throwing the carriage into and out of control of its escapement mechanism, said means comprising a cam, a power driven shaft, and means controlled by the actuation of a tabulator key for connecting said cam to turn with the shaft during approximately a quarter of a revolution thereof only and for again connecting said cam to turn with the shaft through the remaining of the cycle of the cam when the actuated tabulator key is released and returns to normal position, the characteristics of said cam being such that the parts controlled thereby are held in the actuated position not only at the time when the cam is arrested after a quarter revolution thereof but during a considerable portion of the completion of the cycle of the cam.

12. The combination of a carriage; escapement mechanism therefor; a tabulator stop; key controlled power actuated means for controlling the movement of said tabulator stop to and from effective position and for throwing the carriage into and out of control of its escapement mechanism, said means comprising a cam, a power driven shaft, means controlled by the actuation of a tabulator key for connecting said cam to turn with the shaft during approximately a quarter of a revolution thereof only and for again connecting said cam to turn with the shaft through the remaining of the cycle of the cam when the actuated tabulator key is released and returns to normal position, the characteristics of said cam being such that the parts controlled thereby are held in the actuated position not only at the time when the cam is arrested after a quarter revolution thereof but during a considerable portion of the completion of the cycle of the cam; printing keys; and locking means for said printing keys controlled by said cam and maintaining them locked against actuation until the cam has completed most of its cycle.

13. The combination of a power actuated shaft, a cam loosely mounted on said shaft and having a dwell of considerable extent thereon, locking means for locking said cam to rotate with said shaft, a plurality of tabulator keys, means controlled by the actuation of any of said keys for controlling said locking means, a plurality of tabulator stops, and selective means intermediate said cam and stops and selectively controlled by said keys for selectively controlling the movement of said stops into and out of effective position under control of said cam, the actuated tabulator stop being maintained in the effective position so long as the dwell on the cam coacts with the part which is cooperative therewith.

14. The combination of a power actuated cam, a plurality of tabulator keys, a plurality of tabulator stops, and means actuated by said cam for controlling the movement of said stops into and out of effective position, comprising an oscillatory member controlled by said cam, individual actuating devices one for each stop, means for effecting an interengaging connection between said oscillatory member and each of said actuating devices said connection being formed to prevent the two from being separated until the oscillatory member has been returned substantially to normal position, and means controlled by said keys for selectively moving said actuating devices into the path of said oscillatory member and to a position to receive the interengaging connection therewith.

15. The combination of a power actuated shaft, a cam loosely mounted on said shaft and having a dwell of considerable extent thereon, locking means for locking said cam to rotate with said shaft, a plurality of tabulator keys, means controlled by the actuation of any of said keys for controlling said locking means, a plurality of tabulator stops, selective means intermediate said cam and stops and selectively controlled by said keys for selectively controlling the movement of said stops into and out of effective position under control of said cam, the actuated tabulator stop being maintained in the effective position so long as the dwell on the cam coacts with the part which is cooperative therewith, printing keys, and locking means therefor controlled by said cam for locking the printing keys against actuation during the cycling of said cam and for releasing them after the parts controlled by the cam have been released from control of the dwell thereon.

16. The combination of a power actuated cam; a plurality of tabulator keys; a plurality of tabulator stops; means actuated by said cam for controlling the movement of said stops into and out of effective position, comprising an oscillatory member controlled by said cam, individual actuating devices one for each stop, means for effecting an interengaging connection between said oscillatory member and each of said actuating devices that prevents the two from being separated until the oscillatory member has been returned substantially to normal position, and means controlled by said keys for selectively moving said actuating dvices into the path of said oscillatory member and in a position to receive an interengaging connection therewith; printing keys, and locking means therefor controlled by said cam for locking the printing keys against actuation during the cycling of said cam and for releasing them after the parts controlled by the cam have been released in the last portion of the cycle of said cam.

17. The combination of tabulator stops, and power actuated key selected means for controlling the movement of said stops into and out of effective position, said means comprising a power actuated shaft, a cam having a dwell thereon which is effective after the cam has completed substantially a quarter of its cycle, a latch for locking said cam to turn with said shaft, two trips for controlling said latch, said trips being separated a distance corresponding approximately to one quarter of the cycle of said cam, means for connecting said trips to move in unison, one trip moving into the path of the latch when the other trip moves out of the path thereof, tabulator keys, and means controlled thereby for controlling the movements of said trips.

18. The combination of tabulator stops; power actuated key selected means for controlling the movement of said stops into and out of effective position, said means comprising a power actuated shaft, a cam having a dwell thereon which is effective after the cam has completed substantially a quarter of its cycle, a latch for locking said cam to turn with said shaft, two trips for controlling said latch, said trips being separated a distance corresponding approximately to one quarter of the cycle of said cam, means for connecting said trips to move in unison, one trip moving into the path of the latch when the other trip moves out of the path thereof, tabulator keys, and means controlled thereby for controlling the movements of said trips; printing keys; and locking means therefor controlled by said cam for locking the printing keys against actuation during the cycling of said cam and for releasing them after the parts controlled by the cam have been released from control of the dwell thereon.

19. The combination of a power actuated cam, a bail controlled by said cam, a series of tabulator stops, a series of interponents connected with said stops and selectively and individually movable into and out of the path of said bail to be actuated thereby, each of said interponents having a projection adapted to overlap the bail and thereby prevent the interponent from moving out of the path of the bail until the latter is returned substantially to normal position, and key controlled means for controlling the movements of said interponents into and out of the path of the bail.

20. The combination of a power actuated cam, a bail controlled by said cam, a series of tabulator stops, a series of interponents connected with said stops and selectively and individually movable into and out of the path of said bail to be actuated thereby, each of said interponents having a projection adapted to overlap the bail and thereby prevent the interponent from moving out of the path of the bail until the latter is returned substantially to normal position, key controlled means for controlling the movements of said interponents into and out of the path of the bail, printing keys, and means controlled by a movement of any of said tabulator stops into effective position for locking said printing keys against actuation.

21. The combination of tabulator stops, and key controlled power actuated means for controlling the movement of said stops to and from effective position, comprising a cam, a power driven shaft, means controlled by the depression of a tabulator key for connecting said cam to turn with the shaft during approximately a quarter revolution only of said shaft and for again connecting said cam to turn with the shaft during approximately three quarters of a revolution thereof when the actuated key is released and returns to normal position.

22. The combination of tabulator stops; and key controlled power actuated means for controlling the movement of said stops to and from effective position, comprising a cam, a power driven shaft, means controlled by the depression of a tabulator key for connecting said cam to turn with the shaft during approximately a quarter revolution only of said shaft and for again connecting said cam to turn with the shaft during approximately three quarters of a revolution thereof when the actuated key is released and returns to normal position; and detenting means for holding said cam against accidental displacement from its normal position and from the position it attains at a quarter revolution thereof.

23. The combination of a carriage, escapement mechanism therefor, a tabulator stop, a power driven cam having a long dwell thereon, controlling means actuated by said cam for controlling the movement of said tabulator stop into and out of effective position and for releasing the carriage from control of its escapement mechanism, a tabulator key, and means controlled by the depression of said key for turning said cam through less than a half revolution and for rendering it operative on said controlling means to move the tabulator stop to effective position and to release the carriage from control of its escapement mechanism, the parts remaining thus conditioned until on the further movement of the cam the dwell thereon passes said controlling means and the cam has substantially completed its cycle when the controlling means are enabled to return to normal position.

24. The combination of a carriage; escapement mechanism therefor; a tabulator stop; a power driven cam having a dwell thereon; controlling means actuated by said cam for controlling the movement of said tabulator stop into and out of effective position and for releasing the carriage from control of its escapement mechanism; a tabulator key; means controlled by said key for turning said cam through less than a half revolution and for rendering it operative on said controlling means to move the tabulator stop to effective position and to release the carriage from control of its escapement mechanism, the parts remaining thus conditioned until on the further movement of the cam the dwell thereon has passed said controlling means when the controlling means are enabled to return to normal position; printing keys; and locking means therefor controlled by said cam for locking the printing keys against actuation during the cycling of said cam and for releasing them after said controlling means have been released from control of the dwell on said cam.

25. The combination of a carriage, escapement mechanism therefor, a tabulator stop, a power driven cam having a dwell co-extensive with the high part of the cam and extending throughout a considerable extent thereof, controlling means actuated by said cam for controlling the movement of said tabulator stop into and out of effective position and for releasing the carriage from control of its escapement mechanism, a tabulator key, and means controlled by the depression of said key for turning said cam through less than a half revolution and for rendering it operative on said controlling means to move the tabulator stop to effective position and to release the carriage from control of its escapement mechanism and to maintain such condition as long as the key is maintained depressed and thereafter until the cam has completed most of its cycle and the dwell thereon has passed said controlling means, whereby even after the tabulator key has returned to normal position the tabulator stop will not return to normal position and the carriage will not be restored to control of its escapement mechanism until the cam has completed most of its cycle and the dwell thereon has passed said controlling means.

26. The combination of a carriage, escapement mechanism therefor; a tabulator stop; a power driven cam having a dwell co-extensive with the high part of the cam and extending throughout a considerable extent thereof; controlling means actuated by said cam for controlling the movement of said tabulator stop into and out of effective position and for releasing the carriage from control of its escapement mechanism; a tabulator key; means controlled by the depression of said key for turning said cam through less than a half revolution thereof and for rendering said cam operative on said controlling means to move the tabulator stop to effective position and to release the carriage from control of its escapement mechanism and to maintain such condition as long as the key is maintained depressed and thereafter until the cam has completed most of its cycle and the dwell thereon has passed said controlling means, whereby even after the tabulator key has returned to normal position the tabulator stop will not return to normal position and the carriage will not be restored to control of its escapement mechanism until the cam has completed most of its cycle and the dwell thereon has passed said controlling means; printing keys; and locking means therefor controlled by said cam for locking the printing keys against actuation during the cycling of said cam and for releasing them after said controlling means have been released from control of the dwell on the cam.

FREDERICK A. HART.